June 2, 1970  R. N. BEFORE  3,515,259
ENDLESS-CONVEYOR, TRAY-STABILIZING APPARATUS
Filed Sept. 23, 1968  3 Sheets-Sheet 1

INVENTOR
Robert N. Before

BY  Karl W. Flocks
ATTORNEY

INVENTOR
Robert N. Before

BY Karl W. Flocks
ATTORNEY

June 2, 1970  R. N. BEFORE  3,515,259
ENDLESS-CONVEYOR, TRAY-STABILIZING APPARATUS
Filed Sept. 23, 1968  3 Sheets-Sheet 3
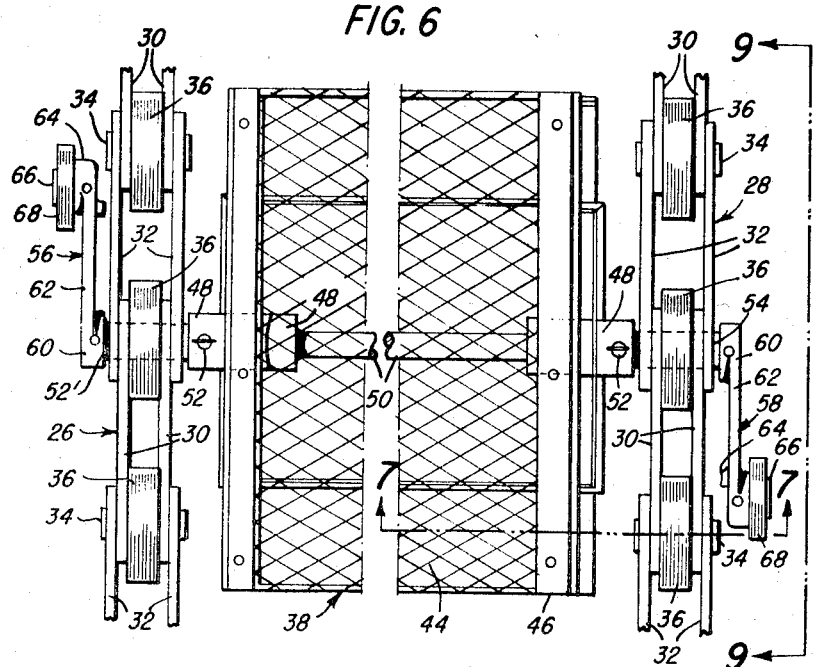
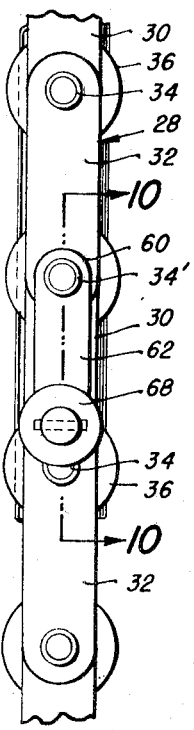
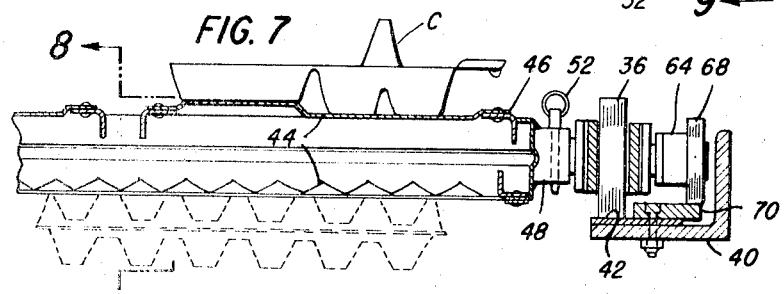
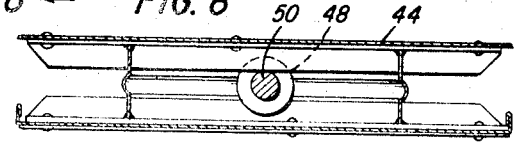
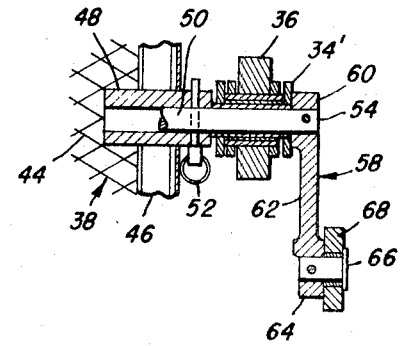
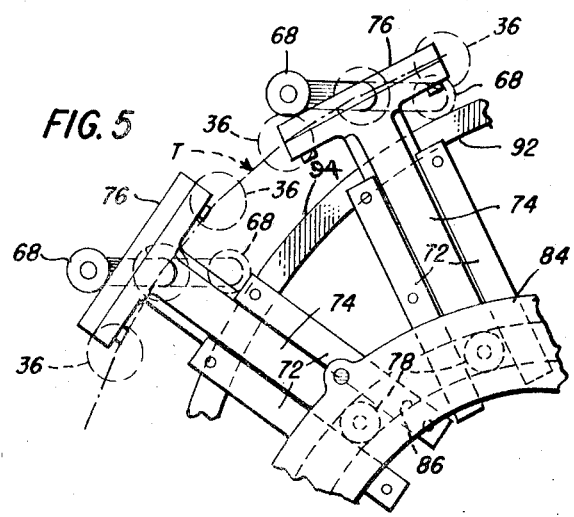
INVENTOR
*Robert N. Before*
BY Karl W. Flocks
ATTORNEY

United States Patent Office 3,515,259
Patented June 2, 1970

1

3,515,259
ENDLESS-CONVEYOR, TRAY-STABILIZING APPARATUS
Robert N. Before, Springfield, Mass., assignor to Diamond International Corporation, New York, N.Y., a corporation of Delaware
Filed Sept. 23, 1968, Ser. No. 761,680
Int. Cl. B65g *17/06*
U.S. Cl. 198—137                                6 Claims

ABSTRACT OF THE DISCLOSURE

An endless conveyor having support trays journaled between and spaced along opposed parallel conveyor chain runs which define an upper, transitional and lower path of travel for the trays, and cam-controlled abutment and guide means whereby the trays are maintained substantially horizontal during movement along the transitional path of travel between the upper and lower runs of the conveyor chains.

---

This invention relates generally to conveyors and more particularly to an improved stabilizer for trays carried on an endless conveyor. The endless conveyors involved are particularly adapted for use in drying ovens or the like where articles lie on a tray and the trays cannot be inverted or angularly displaced to any substantial extent when moving between the upper and lower paths of travel of the conveyor.

Many types of tray stabilizers have been proposed in the prior art, and generally speaking, stabilization of the trays along a horizontal path of travel has not proved too difficult. However, satisfactory stabilization along the transitional path of travel between the upper and lower conveyor runs has, in the past, been extremely difficult to achieve.

Primary objects of the present invention are to provide improved apparatus for stabilizing pivotally supported trays spaced along endless conveyors; to provide an improved traveling control means generally following the transitional path of travel of an endless conveyor between upper and lower conveyor runs and cooperating with follower means of the trays which maintain the trays in a substantially horizontal position;

to provide a control cam surrounding the axis of rotation of endless conveyor chains operative to extend traveling abutments cooperating with supplemental guide means to engage leading and trailing follower means fixed to support levers connected to tray support shafts in which the levers are disposed 180° out-of-phase with respect to each other;

to provide an improved power-operated conveyor tensioning means in combination with the improved tray stabilizing apparatus; and to provide conveyor tray stabilizing apparatus which permits endless conveyors to run at a relatively high speed, which is relatively simple in construction, economical to install and maintain, and which substantially eliminates binding, backlash, but which affords positive tray control during its entire path of travel.

These together with other and more specific objects and advantages of the invention will become apparent from a consideration of the following description when taken in conjunction with the drawings forming a part thereof, and in which.

2

Figure 1:
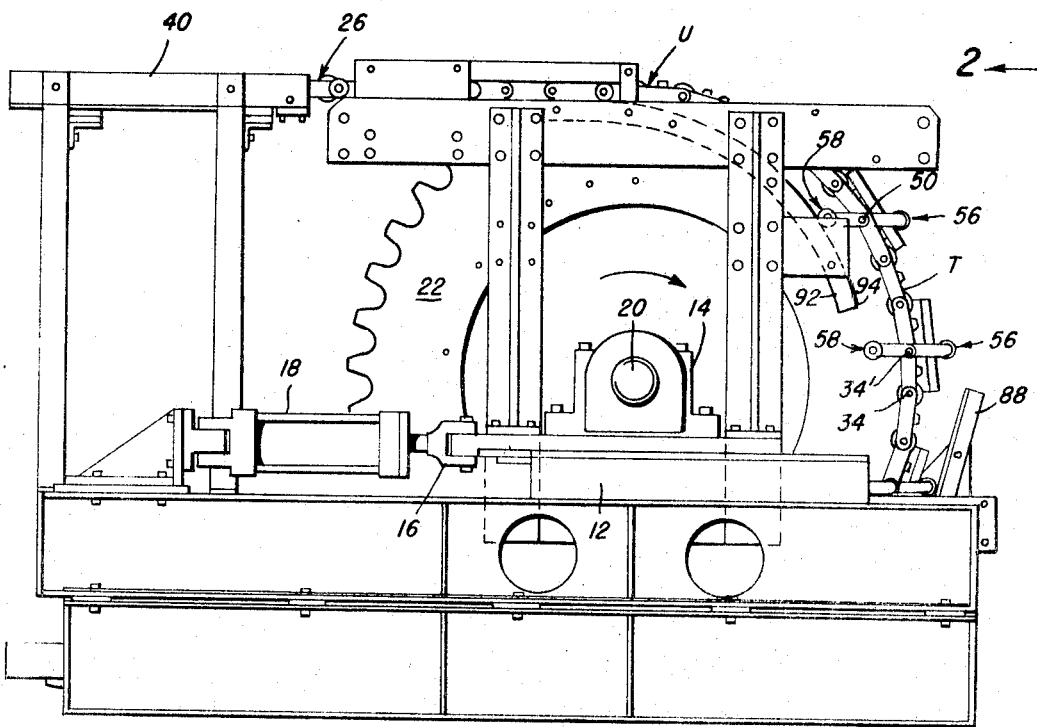
FIG. 1 is a fragmentary side elevational view showing one end of an endless conveyor incorporating the improved tray stabilizing apparatus.
Figure 2:
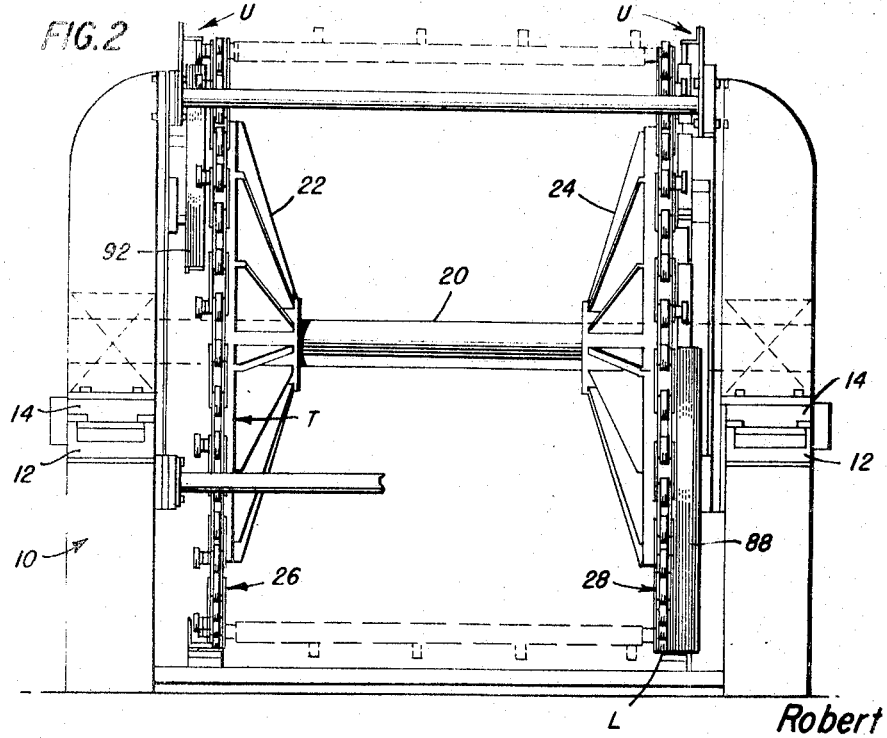
FIG. 2 is an end elevational view looking generally from the plane of line 2—2 of FIG. 1, with support trays shown in phantom lines, and portions broken away.
Figure 3:
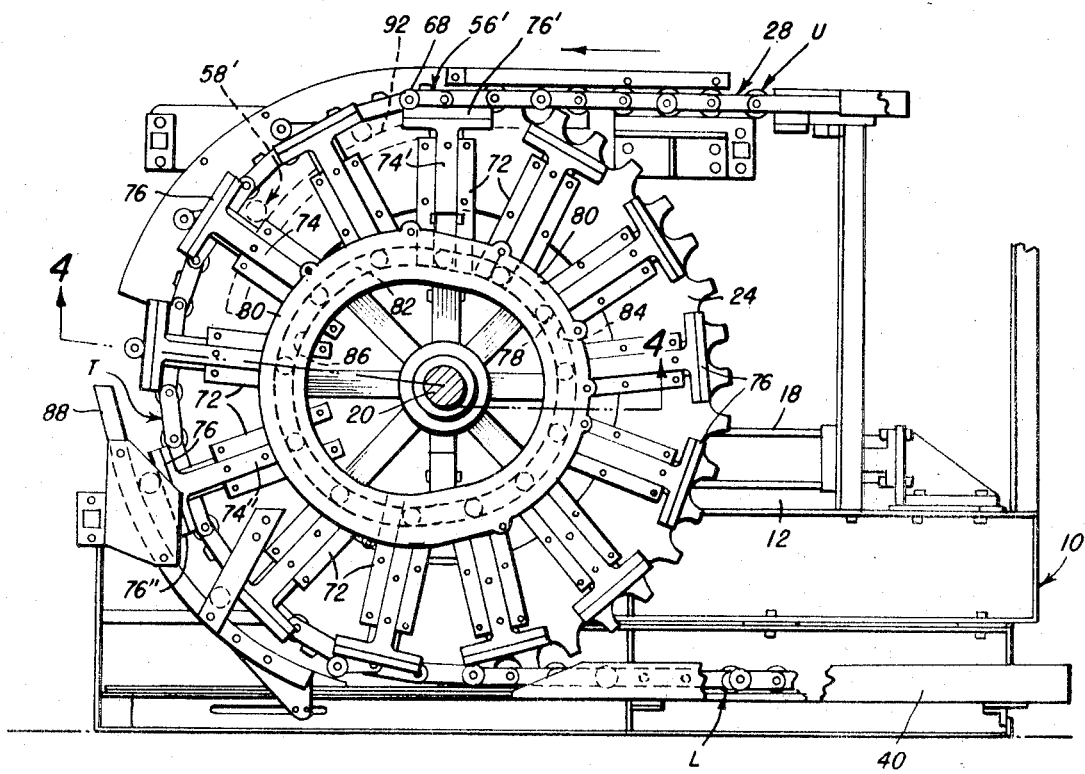
Figure 4:
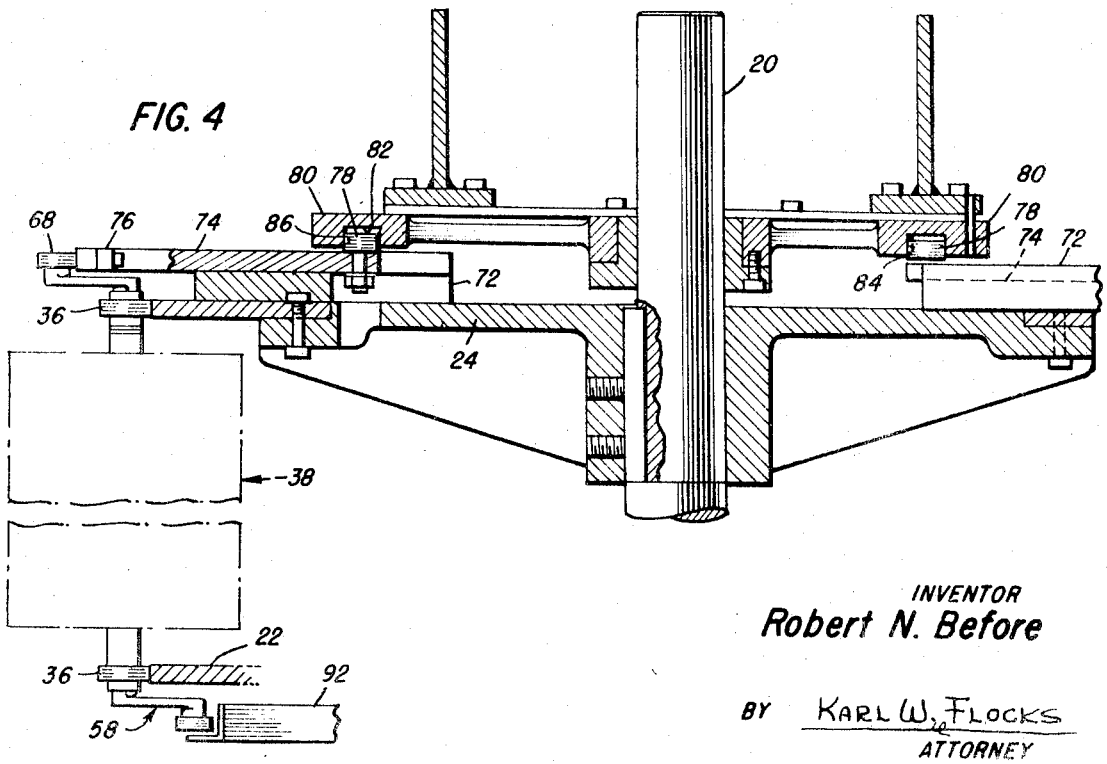

FIG. 3 is a side elevational view, with portions broken away, and looking at the side opposite that shown in FIG. 1;

FIG. 4 is a fragmentary, enlarged section taken substantially on the plane of line 4—4 of FIG. 3 showing a support tray by means of phantom lines;

FIG. 5 is a fragmentary, enlarged view of a portion of FIG. 3 illustrating diagrammatically the manner in which follower means function to maintain trays substantially horizontal during a portion of the transitional path of travel between the upper and lower runs of the endless conveyor;

FIG. 6 is a top plan view of a fragmentary portion of the endless conveyor, showing one of the support trays with intermediate portions broken away;

FIG. 7 is a fragmentary section taken substantially on the plane of line 7—7 of FIG. 6 and showing by means of phantom lines an article such as an egg carton supported on the tray of the endless conveyor;

FIG. 8 is a section taken substantially on the plane of line 8—8 of FIG. 7;

FIG. 9 is a fragmentary elevational view of FIG. 6 looking generally from the plane of line 9—9 of FIG. 6; and FIG. 10 is a section taken substantially on the plane of line 10—10 of FIG. 9.

Before referring to the drawings in detail, it will be understood by those skilled in the art, that only one end of an endless conveyor apparatus is shown in detail, portions of the horizontal runs of the endless conveyor have been omitted, the end (not shown) will be a substantial duplicate end of that illustrated, and the means for operating or driving the endless conveyor has not been shown.

First considering FIGS. 1, 2, 3 and 6, for example, a suitable support frame 10 is provided at opposite ends of the endless conveyor (only one shown). The support frame includes at opposite sides thereof, horizontal tracks 12 in which are reciprocably restrained bearing blocks 14 connected by a clevis 16 to hydraulic rams or the like 18 functioning to adjust and maintain a predetermined tension of the endless conveyor and to prevent excessive slack, backlash, etc.

Journaled for free rotation in the bearing blocks 14 is a transverse sprocket-wheel support shaft 20 which has fixed thereto two transversely spaced sprockets 22 and 24. Entrained over the teeth of the support sprockets 22 and 24 are endless, link-type conveyor chains indicated generally at 26 and 28, respectively. These conveyor chains comprise alternate pairs of inner and outer link elements 30 and 32, respectively, having overlapping apertured ends pivotally connected by transverse pins 34 upon which are journaled roller elements 36; see FIGS. 6, 7, 9 and 10, for example. These roller elements will be engaged between the teeth of the sprockets 22 and 24.

Every third transverse pin, as identified at 34' is tubular or hollow; see FIG. 10, and provides a bearing for tray assemblies 38 as will presently be described. The periphery of the rollers 36 project beyond the side margins of the conveyor chain links; see FIGS. 7 and 9.

The endless conveyor chains 26 and 28 include an upper run U, a lower run L, and transitional end runs T, i.e., where the upper and lower conveyor runs change or reverse direction. The upper and lower conveyor runs U and L are paralleled by suitable support or guide tracks conveniently comprising angle elements 40; see FIG. 7, and the rollers 36 will engage a horizontally disposed and longitudinally extending liner or bearing plate 42 when they depart from the teeth of the support sprockets.

The tray assemblies 38, in this exemplary embodiment, are generally rectangular and preferably have a foraminous support portion 44 secured to a suitable support frame 46. Projecting laterally from opposite sides of the frame 46, and centrally located thereon, are fixed, coaxial connecting sleeves 48 which have projecting therethrough, opposite ends of a transverse support shaft 50; the elements 48 and 50 being connected together by transverse, removable ball pins 52. The support portion 44 and shaft 50 will be integrated in movement by the pins 52, and the foraminous support portion 44 will provide good air circulation when molded egg cartons C or the like are carried through a drying oven (not shown).

The ends 52' and 54 of the shafts 50 project through the hollow or tubular pins 34' of the opposed endless conveyors 26 and 28, and end 52' has fixed thereto a leading, follower means 56, while end 54 has secured thereto a trailing follower means 58. Each of the follower means 56 and 58 comprises a hub 60 secured to the end of a shaft 50, outwardly of the link elements, and the hub 60 is integral with a radially extending lever 62 which terminates in a hub 64 in which is secured a stub shaft 66 upon which a roller 68 is journaled; see FIG. 10. The roller element 68 has a smaller diameter than rollers 36, and flange 42 of the guide track 40 has a raised bearing element or liner 70; see FIG. 7, projecting above element 42 to be engaged by the roller element 68 of the trailing and leading follower means for maintaining the tray assembly support surfaces 44 in a generally horizontal attitude.

It will be noted that a lever 62 of the leading follower means 56 is 180° offset or out-of-phase with respect to the corresponding lever 62 of the trailing follower means 58, i.e., these levers are displaced 180° with respect to the longitudinal axis of the support shafts 50. From the structure described above, it will be clear that during movement of the tray assemblies along the upper and lower conveyor runs U and L, the tray support portions 44 are maintained horizontal by the rollers 68 of the respective follower means engaging the tracks 40, accordingly preventing the support portions 44 from tipping or tilting. The shafts 50 of the tray assemblies, it will be understood, are free to pivot in the tubular pins 34' of the respective endless conveyor chains 26 and 28 and also it is evident that during the transition run T of the endless conveyor, means must be provided for positively controlling the horizontal attitude of the support surface 44 of the tray assemblies.

Bearing in mind that the leading follower 56 is at one end of a support shaft 50 and the trailing follower means 58 is at the opposite end, as the description proceeds, it will be clear that each of the follower means has a control function while traversing the transitional path of travel T of the endless conveyor. The leading follower means 56 will be disposed adjacent and at one side of the support sprocket 24, and the trailing follower means 58 will be at the opposite side of the endless conveyor adjacent the sprocket 22. This arrangement is one merely for convenience and for the purpose of describing a preferred embodiment and may be reversed. Further, as illustrated by the direction arrow in FIG. 3, the endless conveyor is moving from right to left, however, the conveyor could be reversed in direction, i.e., moved from left to right and the mechanism and apparatus to subsequently be described will still function to maintain the tray assemblies and their support surfaces 44 in a substantially horizontal attitude when traversing the transitional path of travel T.

As previously mentioned, the link chain rollers 36 will engage between the teeth of the support sprockets 22 and 24. Referring to FIGS. 3 and 4, the support sprocket 24 has secured to its outer side a plurality of circumferentially spaced, radially opening guide tracks 72, which have reciprocally restrained for radial movement therein guide arms 74. The guide arms 74 are substantially T-shaped in plan, and include at their outer ends transverse abutment head portions 76. Journaled on the inner ends of the arms 74 on a suitable support shaft are laterally extending cam follower elements 78 and means is provided for extending or projecting the abutment-head portions 76 radially outwardly through the entire 180° of the transitional path of travel T. This means mentioned above, comprises a control cam 80 suitably fixed to the support frame 10 and fixed with respect to the rotating sprocket 24. The control cam 80 includes a continuous control track portion 82 in which the cam follower rollers or elements 78 of the arms 74 are confined. The continuous cam track portion 82; see FIG. 3, includes an inner portion 84 generally concentric to the axis of rotation of the support shaft 20 of the support sprocket, and communicating with the inner cam track portion 84 is a cam track portion 86 which is offset radially with respect to the axis of the sprocket shaft 20.

As seen in FIG. 3, as the upper run U of the endless conveyor chain 28 approaches the upper portion or entrance of the transitional path of travel T, the uppermost head portion 76' of arm 74' will be disposed substantially parallel to and tangentially engage with an adjacent roller 68 of a leading follower means 56' which reaches the entrance to the transitional path of travel in the relationship illustrated. Continued movement of the leading follower means 56' is accompanied by corresponding movement of the abutment head 76' which moves radially outwardly by virtue of the character of the control cam portion 86. As the conveyor chain continues along the transitional path of travel, and in view of the attitude assumed by the roller 68 of the leading follower means, for approximately the first 90° of the transitional path of travel, the abutment head 76' prevents the shaft 50, to which the leading follower means 56 is secured, from rotating in a counterclockwise direction. During the last 90° of the transitional path of travel, there is provided on the support frame 10 a supplemental, arcuate guide track 88 which is substantially parallel to the transitional path of travel T and will be in opposed relation to the abutment heads 76". While the tray assemblies are traversing the last 90° of the transitional path of travel, any tendency of the trays to pivot counterclockwise, as viewed in FIG. 3, will be prevented by the still extended abutment heads 76'. The radially extendable arms and heads 74 and 76 are conveniently identified as traveling control means since they move through the entire 360° of travel of the support sprocket 24.

As mentioned above, the control structure cooperating with the leading follower means 56 is located adjacent the sprocket 24 and during functioning of the leading follower means 56 while cooperating with the abutment head 76 and guide track 88, follower means 58 likewise functions to control the attitude of the support portion 44 of the tray assemblies. For example, and as described above, the leading follower means prevents counterclockwise rotation of the tray assemblies 38 about their support shafts 50, and clockwise rotation is prevented by a second supplemental guide track through the first 90° of the transitional path of travel. A second supplemental guide track is indicated at 92 in FIGS. 1 and 3 as well as in FIG. 4, and this guide track is located outwardly of sprocket 22 and has an outer surface 94 extending substantially parallel to but spaced inwardly of the transitional path of travel and is engaged by the roller 68 of the trailing follower means 58 to maintain the levers 62 of the respective follower means in a substantially horizontal position as illustrated in FIGS. 1 and 3.

Although minor tilting may occur in the tray assemblies 38 i.e., while passing a plus or minus 15° beyond a horizontal plane passing through the shaft 20 of the support sprockets, nevertheless, these tray assemblies are positively maintained under control by the traveling abutment means comprising the T-shaped elements 74, 76, controlled by the fixed cam 80 and supplemental guide tracks 88 and 92.

There has been disclosed a relatively simple means for controlling tray assemblies of an endless conveyor through their transitional paths of travel about the support sprockets at the ends of travel of the endless conveyors while affording substantially balanced tray assemblies permitting the endless conveyor to be operated at relatively high speeds, eliminating the possibility of the tray assemblies from inadvertently being inverted, the jamming or binding and losing their horizontal attitude when passing through the transitional path of travel.

It will be obvious to those skilled in the art that various changes may be made without departing from the scope of the invention and the invention is not to be considered limited to what is shown in the drawings and described in the specification.

What is claimed is:

1. In a conveyor having a pair of support sprockets and a pair of endless conveyor chains entrained over the respective sprockets and defining an upper, transitional and lower run with respect to said sprockets;
   support shafts journaled on and extending transversely of said conveyor chains;
   support trays secured to said support shafts for movement therewith; and
   means for maintaining said trays in a stable attitude during movement of said conveyor chains through the paths of travel along said upper, transitional and lower runs, the improvement comprising, in combination:
   leading and trailing follower means connected to said support shafts and disposed 180° out-of-phase with respect to each other;
   guide-track means substantially paralleling said upper and lower conveyor runs for engagement by said respective follower means for maintaining said support trays and shafts stable along the paths of travel defined thereby;
   traveling control means adjacent one of said support sprockets for movement therewith through said transitional path of travel,
       said traveling control means including abutment means engageable with said leading follower means during substantially 180° of said transitional path of travel about said one support sprocket between said upper and lower conveyor runs for aiding to maintain said support trays stable;
   first supplemental guide means adjacent said transitional path of travel of said one support sprocket and substantially paralleling the last 90° thereof for engaging said leading follower means and cooperating with said traveling control means for maintaining said support trays stable and in substantially the same position assumed in said upper and lower paths of travel; and
   second supplemental guide means substantially paralleling the first 90° of the transitional path of travel of said other support sprocket and engageable by said trailing follower means for cooperating with said traveling control means and aiding to maintain said support trays in the stable position.

2. The structure as claimed in claim 1 in which said leading and trailing follower means comprise lever portions secured to opposite ends of said support shafts and extending 180° out-of-phase with respect to the longitudinal axis of said support shafts, said lever portions including roller elements journaled on the terminal ends thereof on axes of rotation parallel to the longitudinal axis of the support shafts.

3. The structure as claimed in any one of claims 1 and 2 on which said trays include lateral sleeve portions, said lateral sleeve portions of said trays being telescopically engaged on said support shafts; and
   means detachably connecting said sleeve portions to said support shafts whereby the shafts and trays are connected to pivot in unison.

4. The structure as claimed in any one of claims 1, 2 and 3 in which said traveling control means abutment means comprises radially projectable elements spaced radially about the axis of rotation of said support sprockets and having a portion positionable substantially tangential relative to the transitional path of travel between said upper and lower runs.

5. The structure as claimed in any one of claims 1, 2, 3 and 4 in which said traveling control means comprises a control cam surrounding the axis of rotation of said support sprockets and fixed relative to said axis of rotation, said control cam including a continuous track portion surrounding the axis of rotation of said support sprockets, said continuous cam track including a first portion extending substantially 180°, spaced from the transitional path of travel, and concentric to the axis of rotation of said support sprockets, said first cam track portion terminally communicating with a second portion substantially concentric to and off-set toward said transitional path of travel radially with respect to said support shaft axis of rotation, said abutment means comprising support arms reciprocally supported for movement with said one sprocket and radiating from the axis of rotation thereof, said support arms including cam-track followers engaged in said continuous, cam-track portion.

6. The structure as claimed in any one of claims 1, 2, 3, 4 and 5 including a sprocket support shaft upon which said support sprocket is secured in transversely spaced relation, bearings disposed at opposite ends of said sprocket support shaft and in which the same are journaled,
   support carriages reciprocally supporting said bearings for movement parallel to the upper and lower runs of said conveyor chains; and
   power means connected to said support carriages for adjusting the tension in said upper and lower conveyor runs.

References Cited

UNITED STATES PATENTS 2,626,700    1/1953    Schonwald _____ 198—138

HUGO O. SCHULZ, Primary Examiner

U.S. Cl. X.R.

198—208